(12) United States Patent
Matsui et al.

(10) Patent No.: US 7,542,051 B2
(45) Date of Patent: Jun. 2, 2009

(54) CALIBRATION METHOD AND APPARATUS

(75) Inventors: Taichi Matsui, Yokohama (JP); Yasuo Katano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 11/390,437

(22) Filed: Mar. 28, 2006

(65) Prior Publication Data

US 2006/0221098 A1  Oct. 5, 2006

(30) Foreign Application Priority Data

Apr. 1, 2005  (JP) ............................. 2005-106792

(51) Int. Cl.
*G09G 5/00* (2006.01)
(52) U.S. Cl. .................................................. 345/633
(58) Field of Classification Search .................. 345/633
See application file for complete search history.

(56) References Cited

U.S. PATENT DOCUMENTS

| | | | | |
|---|---|---|---|---|
| 6,094,625 | A * | 7/2000 | Ralston ....................... | 702/150 |
| 6,898,307 | B1 * | 5/2005 | Harrington .................. | 382/154 |
| 6,937,255 | B2 * | 8/2005 | Fukuda et al. ............... | 345/633 |
| 6,972,734 | B1 * | 12/2005 | Ohshima et al. .............. | 345/8 |
| 7,162,054 | B2 * | 1/2007 | Meisner et al. ............. | 382/103 |
| 7,312,795 | B2 * | 12/2007 | Aso et al. .................... | 345/419 |
| 7,369,101 | B2 * | 5/2008 | Sauer et al. .................... | 345/8 |
| 2002/0158873 | A1* | 10/2002 | Williamson .................. | 345/427 |

(Continued)

FOREIGN PATENT DOCUMENTS

JP    2000-353248    12/2000

(Continued)

OTHER PUBLICATIONS

E. McGarrity, et al., "A New System for Online Quantitative Evaluation of Optical See-Through Augmentation", Augmented Reality, 2001, Oct. 2001, pp. 157-166.

(Continued)

*Primary Examiner*—Kee M Tung
*Assistant Examiner*—David H Chu
(74) *Attorney, Agent, or Firm*—Fitzpatrick, Cella, Harper & Scinto (57) ABSTRACT

A calibration method and apparatus acquires a correction value to correct position and orientation measured by using a position and orientation sensor provided on a physical object by measuring position and orientation of the physical object when a calibration is started, generating an image of the virtual object existing on a plane on which the physical object can be moved, and displaying a composite image formed by superimposing the image of the virtual object on the captured image of the physical object. Additional features include detecting an instruction indicating that a predetermined positional relationship between the physical object and the virtual object is satisfied, providing a second measuring position and orientation of the physical object when the instruction is detected, and acquiring the correction value expressed by parallel movement of the physical object on the plane and rotation of the physical object about an axis set in the direction perpendicular to the plane on the basis of the first position and orientation measured and the second position and orientation measured.

10 Claims, 4 Drawing Sheets

U.S. PATENT DOCUMENTS

| | | | |
|---|---|---|---|
| 2003/0080978 A1* | 5/2003 | Navab et al. | 345/633 |
| 2003/0227470 A1* | 12/2003 | Genc et al. | 345/633 |
| 2004/0080467 A1* | 4/2004 | Chinthammit et al. | 345/7 |
| 2004/0080548 A1* | 4/2004 | Daily et al. | 345/850 |
| 2004/0119662 A1* | 6/2004 | Dempski | 345/8 |
| 2004/0131232 A1* | 7/2004 | Meisner et al. | 382/103 |
| 2004/0212630 A1* | 10/2004 | Hobgood et al. | 345/633 |
| 2005/0068314 A1 | 3/2005 | Aso et al. | 345/419 |
| 2005/0179617 A1* | 8/2005 | Matsui et al. | 345/7 |
| 2005/0215879 A1* | 9/2005 | Chuanggui | 600/407 |
| 2005/0276444 A1* | 12/2005 | Zhou et al. | 382/103 |
| 2006/0152434 A1* | 7/2006 | Sauer et al. | 345/8 |
| 2006/0277474 A1* | 12/2006 | Robarts et al. | 715/745 |

FOREIGN PATENT DOCUMENTS

| | | |
|---|---|---|
| KR | 1999-0042072 | 6/1999 |
| WO | WO 2004/113991 | 12/2004 |

OTHER PUBLICATIONS

Genc, et al., "Optical See-Through HMD Calibration: A Stereo Method Validated with a Video See-Through System", Augmented Reality, 2000, Oct. 2000, pp. 165-174.

Rueckert, et al., "Automated Camera Calibration for Image-guided Surgery Using Intensity-based Registration", Proceedings of the Spie—The International Society for Optical Engineering, Spie, Bellingham, VA, vol. 4681, Jan. 1, 2002, pp. 463-471.

Azuma, "A Survey of Augmented Reality", Presence, Cambridge, MA, Aug. 1997, pp. 1-48.

\* cited by examiner

CALIBRATION METHOD AND APPARATUS

FIELD OF THE INVENTION

The present invention relates to a calibration method and apparatus which acquire a correction value for correcting a difference in position and orientation between a physical object and a virtual object which is superimposed on a captured image of the physical object.

BACKGROUND OF THE INVENTION

A virtual reality (VR) system is a system which gives a user an experience as if a virtual space is an actual space, by presenting three-dimensional computer graphics (CG) generated by a computer to a user. Further, in recent years, there have also been developed techniques for presenting information which does not exist in a real world, to the user by compositing the three-dimensional CG with a captured image of a real space. The techniques are referred to as an augmented reality (AR) system and a mixed reality (MR) system.

In an AR system, three-dimensional CG can be superimposed on a physical (real) object. For example, in a game shown in Japanese Patent Laid-Open No. 2000-353248 (U.S. Pat. No. 6,972,734B1), three-dimensional CG such as a sword and weapons is displayed superimposed on a captured image of an interactive operation input device held by a user so as to enable the user to freely operate virtual objects (in this case, the sword and weapons).

In such a system, registration accuracy between the physical object and the virtual object is important in order to give a user a sense of immersion. However, it a takes long time to perform calibration for precisely superimposing the virtual object on the physical object, and a skill suitable for performing the calibration is required.

SUMMARY OF THE INVENTION

The present invention has been made in view of the above described problem of the prior art. An object of the present invention is to reduce the time required for the calibration processing to acquire a correction amount for correcting the positional difference between the physical object and the virtual object, and to facilitate the calibration processing.

According to an aspect of the present invention, there is provided a calibration method for acquiring a correction value to correct a difference in position and orientation between a physical object and a virtual object superimposed on a captured image of the physical object, the calibration method comprising: a measuring step of measuring position and orientation of the physical object; a virtual object generation step of generating an image of the virtual object existing on a plane on which the physical object can be moved; a displaying step of displaying a composite image formed by superimposing the image of the virtual object on the captured image of the physical object; a detecting step of detecting an instruction to acquire a correction value to correct a difference between position and orientation of the physical object and position and orientation of the virtual object in the composite image; and an acquiring step of acquiring, in response to the instruction, the correction value expressed by parallel movement of the physical object on the plane and rotation of the physical object about an axis set in the direction perpendicular to the plane.

According to another aspect of the present invention, there is provided a calibration method for acquiring a correction value to correct a difference in position and orientation between a physical object and a virtual object superimposed on a captured image of the physical object, the calibration method comprising: a first measuring step of measuring position and orientation of the physical object which can be moved; a capturing step of capturing an image of the physical object by a camera provided on a head mounted type display device worn by an observer; a second measuring step of measuring position and orientation of the camera: a virtual object generation step of rendering a virtual object on the basis of the position and orientation measured in the second measuring step, in a manner that the virtual object is to be observed by the observer as existing on a predetermined plane; a displaying step of compositing the rendered virtual object and the image captured by the camera and of displaying the composite image on the head mounted type display device; a detecting step of detecting an instruction by the observer, the instruction indicating that the physical object is observed by the observer with a condition that a predetermined positional relationship between the physical object and the virtual object is satisfied; and an acquiring step of acquiring, as the correction value, a difference of position and orientation between the physical object and the virtual object at the time when the instruction is detected, wherein in the virtual object generation step, the virtual object is rendered in a moved and/or rotated manner on the plane on the basis of the position and orientation measured in the first measuring step.

According to a further aspect of the present invention, there is provided a calibration apparatus for acquiring a correction value to correct a difference in position and orientation between a physical object and a virtual object superimposed on a captured image of the physical object, the calibration apparatus comprising: a measuring unit adapted to measure position and orientation of the physical object; a virtual object generation unit adapted to generate an image of the virtual object existing on a plane on which the physical object can be moved; a displaying unit adapted to display a composite image formed by superimposing the image of the virtual object on the captured image of the physical object; a detecting unit adapted to detect an instruction to acquire a correction value to correct a difference between position and orientation of the physical object and position and orientation of the virtual object in the composite image; and an acquiring unit adapted to acquire, in response to the instruction, the correction value expressed by parallel movement of the physical object on the plane and rotation of the physical object about an axis set in the direction perpendicular to the plane.

According to yet further aspect of the present invention, there is provided a calibration apparatus for acquiring a correction value to correct a difference in position and orientation between a physical object and a virtual object superimposed on a captured image of the physical object, the calibration apparatus comprising: a first measuring unit adapted to measure position and orientation of the physical object which can be moved; a capturing unit adapted to capture an image of the physical object by a camera provided on a head mounted type display device worn by an observer; a second measuring unit adapted to measure position and orientation of the camera; a virtual object generation unit adapted to render a virtual object on the basis of the position and orientation measured in the second measuring unit, in a manner that the virtual object is to be observed by the observer as existing on a predetermined plane; a displaying unit adapted to composite the rendered virtual object and the image captured by the camera and to display the composite image on the head mounted type display device; a detecting unit adapted to detect an instruction by the observer, the instruction indicating that the physical object is observed by the observer with a condition that a predetermined positional relationship between the physical object and the virtual object is satisfied; and an acquiring unit adapted to acquire, as the correction value, a difference of position and orientation between the physical object and the virtual object at the time when the instruction is detected, wherein in the virtual object generation unit, the virtual object is rendered in a moved and/or rotated manner on the plane on the basis of the position and orientation measured in the first measuring unit.

With these arrangement, according to the present invention, it is possible to reduce the time required for the calibration processing and to facilitate the calibration processing.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Figure 1:
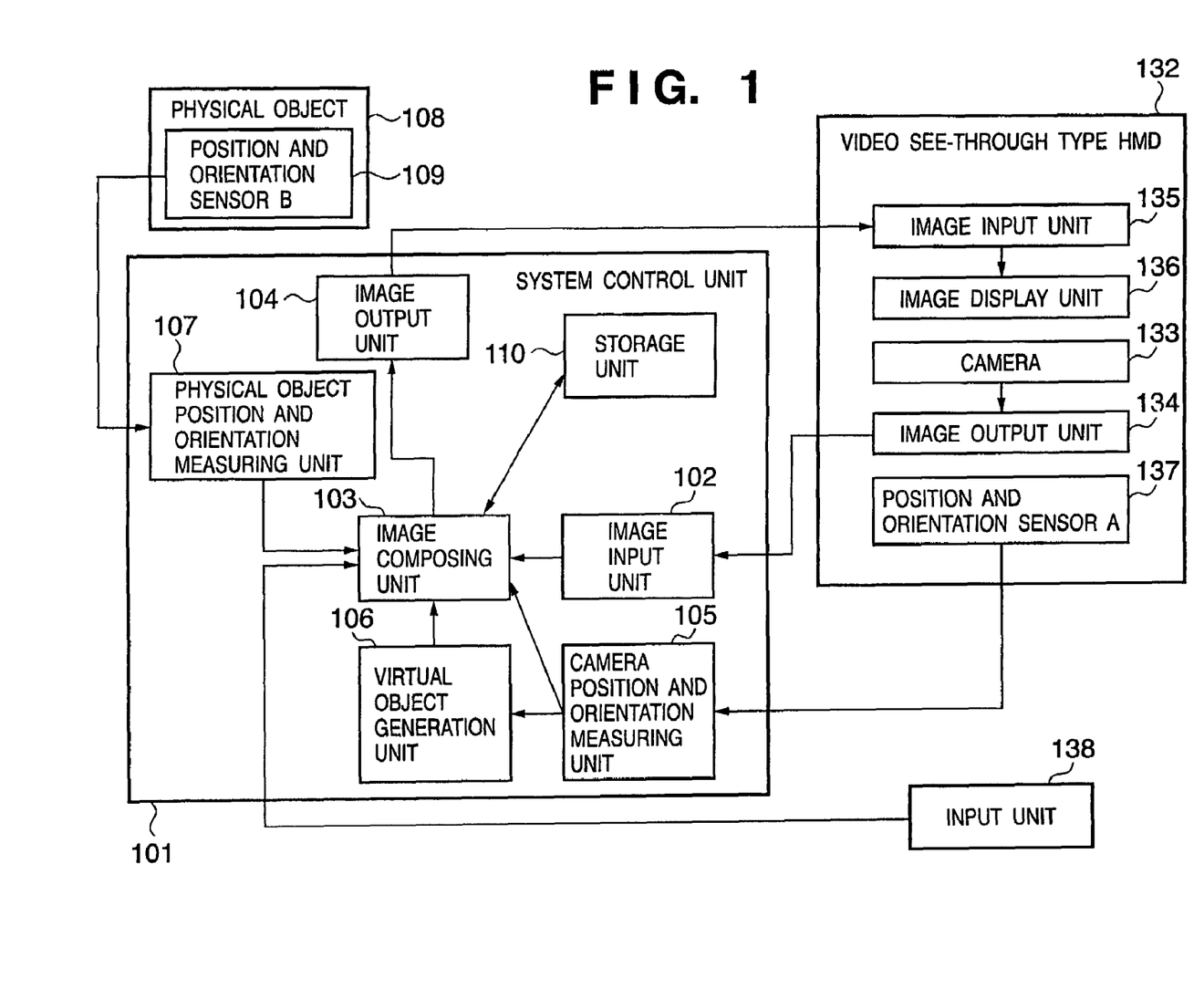
FIG. 1 is a figure showing an exemplary configuration of an MR presenting system according to an embodiment of the present invention.

FIG. 1 is a block diagram showing an exemplary configuration of an MR presenting system according to an embodiment of the present invention. The system has an image input unit 102, an image composing unit 103, an image output unit 104, a camera position and orientation measuring unit 105 and a virtual object generation unit 106. In addition, the system has a system control unit 101 provided with a physical object position and orientation measuring unit 107, a video see-through type head-mounted-display (HMD) 132 worn by a user and a physical object 108. Note that the physical object 108 is provided with a position and orientation sensor B (109).

The system control unit 101 is provided with a data input interface and is realized by a computer which executes a control program stored in a nonvolatile memory (not shown) and the like. Here, as the data input interface, for example, there are a display interface, a video capture board, a serial interface and the like.

The video see-through type head-mounted-display (HMD) 132 is provided with a camera 133 which obtains a photographic image from the vicinity of a user's viewpoint position, and an image output unit 134 which outputs the image captured or sensed by the camera 133. Further, the HMD 132 is provided with an image display unit 136 which is for example an LCD, and an image input unit 135 which receives an image to be displayed on the image display unit 136 from the image output unit 104 of the system control unit 101. Further, the HMD 132 is provided with a position and orientation sensor A (137).

The camera 133 of the HMD 132 mounted on the head of the user senses a real space from a position near the user's viewpoint in the user's line-of-sight direction. The captured image of the real space is transmitted to the image output unit 134. The image output unit 134 transmits the image of the real space to the image input unit 102 of the system control unit 101.

In the system control unit 101, the image data of the real space received from the image input unit 102 are transmitted to the image composing unit 103. The camera position and orientation measuring unit 105 measures position and orientation of the camera 133 by the position and orientation sensor A (137) of the HMD 132, and transmits the measured result to the virtual object generation unit 106 as camera position and orientation information.

In the present embodiment, the physical object 108 is used in order to make a virtual object superimposed thereon. The physical object position and orientation measuring unit 107 measures position and orientation of the physical object 108 by using the position and orientation sensor B (109) provided on the physical object 108. The measured result is transmitted to the virtual object generation unit 106 as physical object position and orientation information.

In the virtual object generation unit 106, a virtual object image is generated in the position and orientation of the physical object 108 seen from the viewpoint of the camera 133 on the basis of the camera position and orientation information and the physical object position and orientation information. The virtual object generation unit 106 transmits the generated virtual object image to the image composing unit 103.

In the image composing unit 103, the image of real space and the virtual object image are composed to generate an MR-space image which is transmitted to the image output unit 104. The image output unit 104 transmits the MR-space image to the image input unit 135 of the HMD 132. The image input unit 135 transmits the received MR-space image to the image display unit 136. The image display unit 136, for example, which is a display device provided in front of the user's eyes, displays the MR-space image. The user observes the MR-space image and thereby can experience feeling as if the virtual object registered in the real space exists. Further, a storage unit 110 stores certain types of information including the model information of the virtual object, which are required for generating the MR-space image.

Note that the explanation is omitted here in order to facilitate explanation and understanding, but in practice, there are two systems for a left eye and a right eye in the configuration and operation for generating the above described MR-space image. That is, the camera 133 consists of a camera for left eye, and a camera for right eye, and the position and orientation of each of the cameras are measured. The camera 133 generates a virtual object image in the position and orientation of the physical object seen from the viewpoint position of each of the cameras, and to thereby generate and display the MR-space images for left eye and right eye. Such configuration enables a three dimensional display using parallax to be effected, and the user to physically sense the MR-space as a more realistic space.

Next, a calibration operation in the present system is described.

Figure 2:
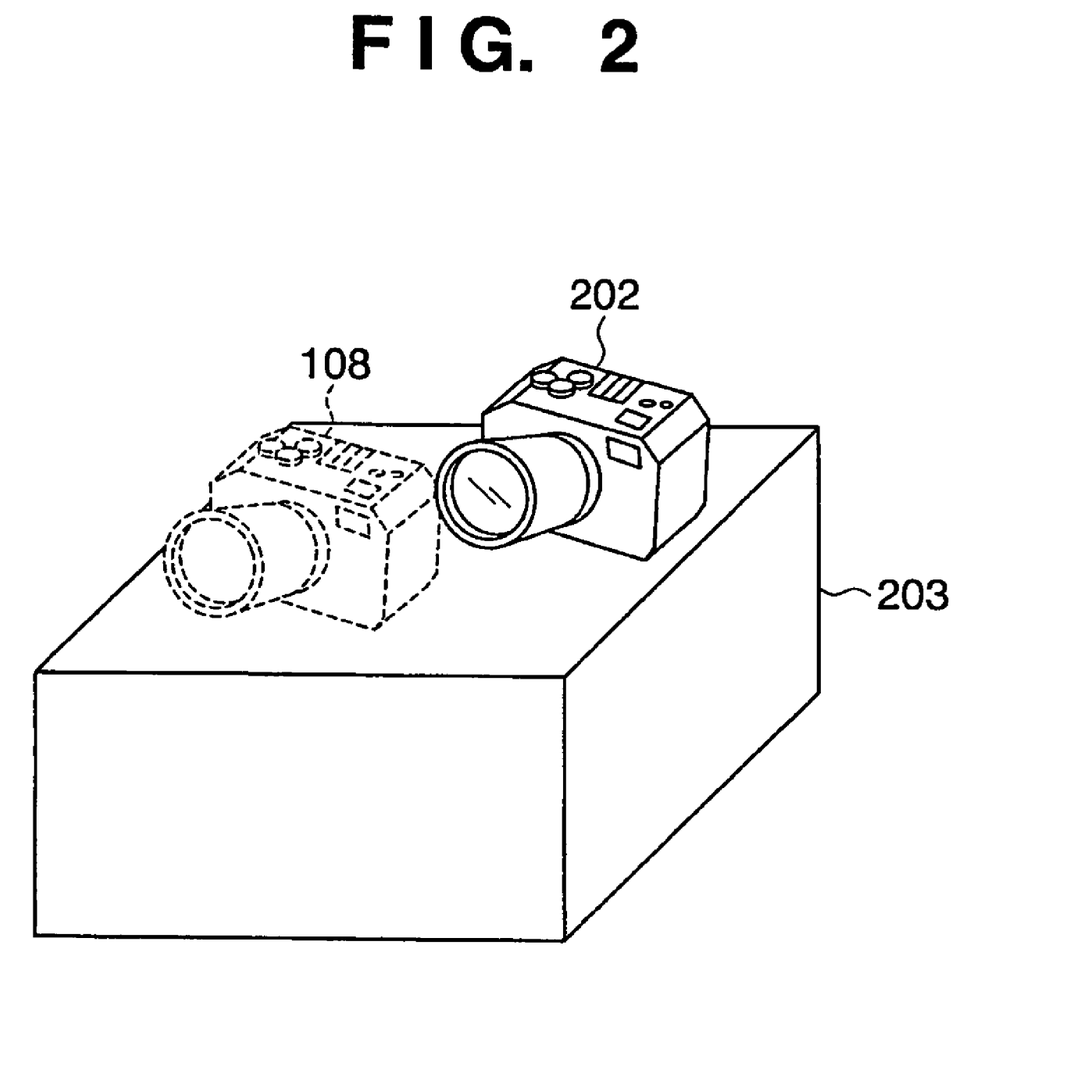
FIG. 2 is a figure showing examples of a physical object and a virtual object which are used for calibration in the system according to the present embodiment.

As described above, the calibration is a registration process between the virtual space and the real space, which is performed at least before the MR-space image is generated. FIG. 2 is schematically showing a situation where the calibration is performed in the present system. Here, a camera 108 is used as a physical object which is used for the calibration in the present system, the position and orientation of the physical object being measurable. Further, FIG. 2 shows a case where a camera having the same size and shape as those of the camera 108 is rendered by computer graphics (CG), as a virtual object used for registration with the physical object.

However, there is no restriction on the size and form of the physical object and the virtual object, provided (1) that a matched condition in position and orientation between the physical object and the virtual object can be easily recognized by a user, (2) that the position and orientation between the physical object and the virtual object can be uniquely matched by parallel movement on a predetermined plane and by rotation about an axis set in the direction perpendicular to the plane, and (3) that the physical object can be manually moved by the user.

In the example as described below, in order to facilitate explanation and understanding, there is described a case where the predetermined plane is a horizontal plane, and the direction perpendicular to the predetermined plane is a vertical direction.

Further, in FIG. 2, the horizontal plane is formed by an upper surface of a base 203, and a virtual object 202 and the physical object 108 are arranged so as to bring planes constituting the bottom surfaces of the objects into contact with the upper surface of the base 203. Thus, the physical object 108 is moved in parallel and rotated while being slid on the base 203, whereby the registration between the physical object 108 and the virtual object 202 can be effected.

Note that here, the predetermined plane is formed by the upper surface of the base 203, and the base 203 is used as a table for placing the physical object, so that the plane where the physical object 108 can be moved is fixed to a horizontal plane. However, the base 203 is not needed when the plane where the physical object 108 can be moved is fixed to one plane. That is, it is possible to utilize an arbitrary configuration which functions as a mechanism to fix the physical object 108 in a certain plane. However, from the viewpoint of operability and ease of computing, the plane where the physical object 108 can be moved is preferably a horizontal plane.

Figure 3:
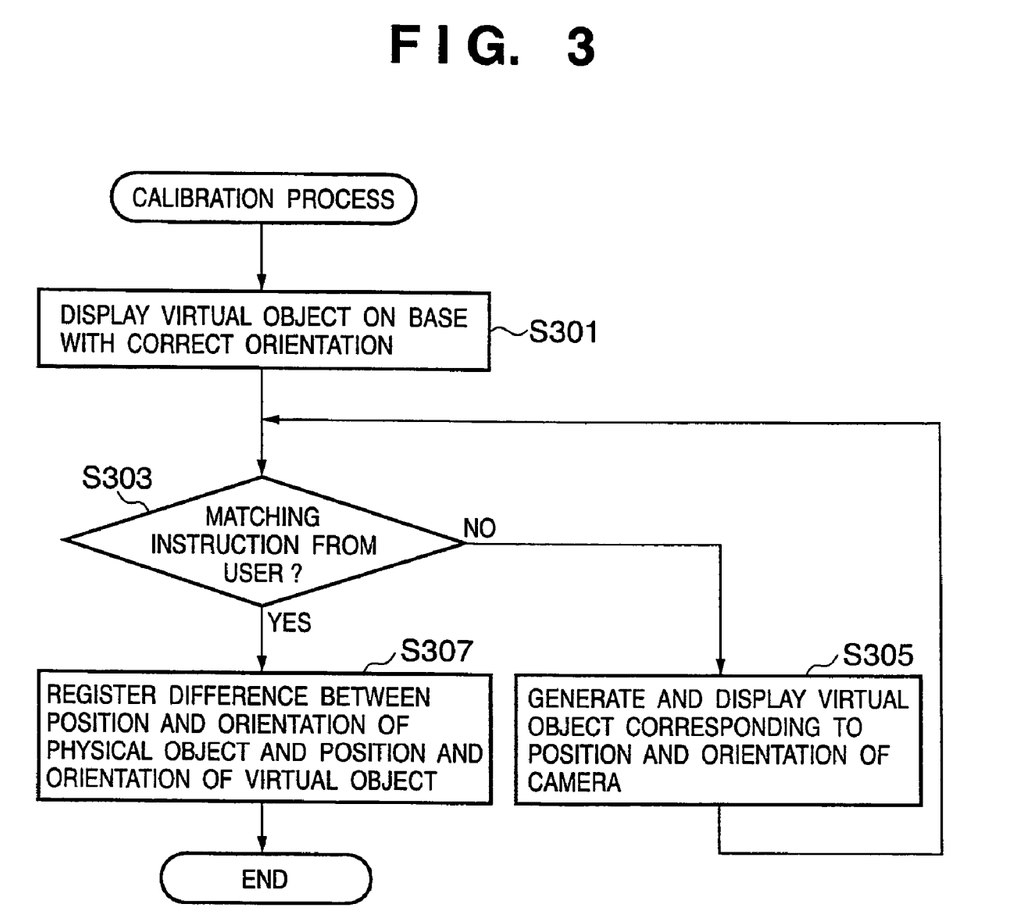
FIG. 3 is a flow chart for explaining a calibration process in the system according to the present embodiment.

The processing to calibrate the system by using the physical object 108 and the virtual object 202, as described above, is explained by using a flow chart shown in FIG. 3. This processing is started by an instruction of a user on which the HMD 132 is mounted.

First, in S301, the virtual object generation unit 106 reads a model of the virtual object 202 from the storage unit 110. Then, the virtual object generation unit 106 renders the virtual object 202 as it is in a position so as to be placed on the upper surface of the base 203, on the basis of coordinate values in a world coordinate system of the base 203 which are measured in advance, and an output of the position and orientation sensor A (137) of the HMD 132. The coordinate values in the world coordinate system of the base 203 which are measured in advance are stored in the storage unit 110. Note that the virtual object 202 at this time is brought into contact with a horizontal plane at its bottom or with the upper surface of the base 203 by a mechanism for keeping the fixed horizontality, so that the orientation of the virtual object 202 is horizontally held. The image of the virtual object 202 is combined with the real space image picked up by the camera 133, that is, the image of the base 203 in the image composing unit 103, and the resultant image is displayed by the image display unit 136 of the HMD 132 via the image output unit 104 and the image input unit 135.

Figure 4:
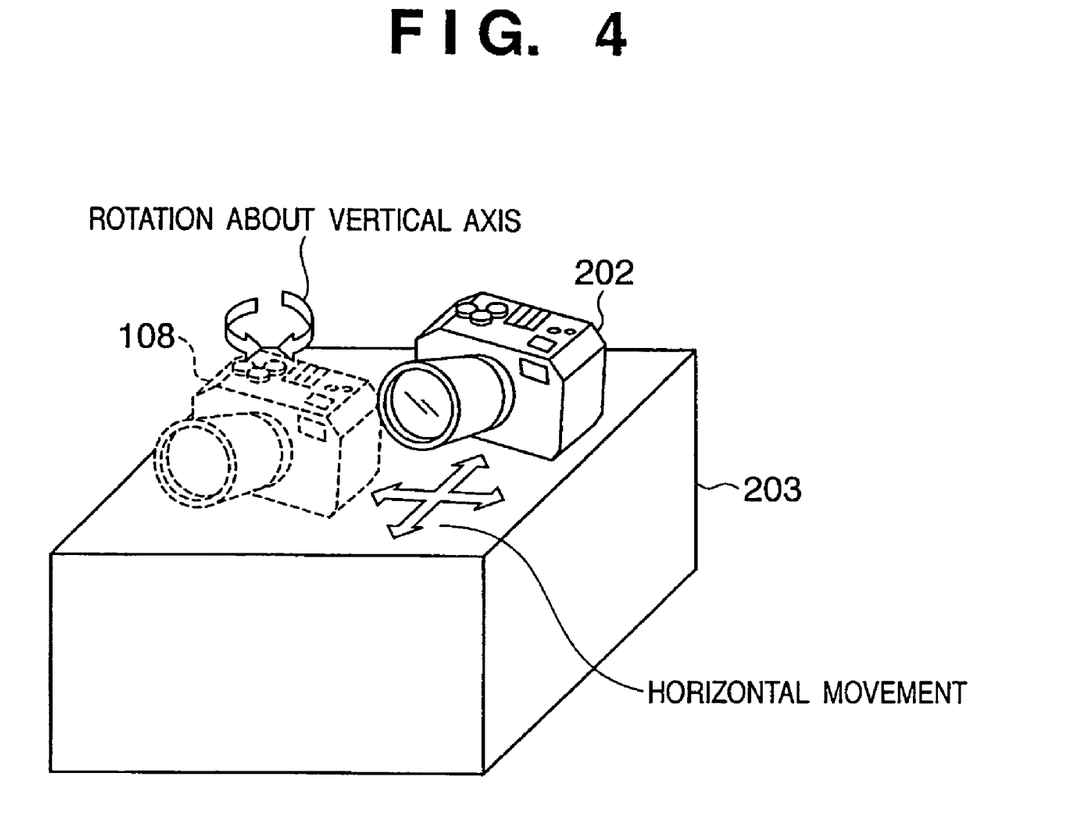
FIG. 4 is a figure explaining a calibration method of the system according to the present embodiment.

In this state, the virtual object 202 and the physical object 108 are in a positional relationship in which their bottom surfaces are formed into a common plane. Thereby, as shown in FIG. 4, the user can match in S302 the position and orientation of the physical object 108 with the position and orientation of the virtual object 202 by combining the horizontal movement on the horizontal plane of the base 203 with the rotation about the axis set in the vertical direction.

The camera position and orientation measuring unit 105 detects the position and orientation of the camera 133 from the output of the position and orientation sensor A (137) of the HMD 132. The virtual object generation unit 106 generates and renders the virtual object so as to match the detected position and orientation. On the other hand, the physical object position and orientation measuring unit 107 detects the position and orientation of the physical object 108 from the output of the position and orientation sensor B (109) provided on the physical object 108, and outputs the detected position and orientation to the image composing unit 103.

The system control unit 101 checks whether a matching instruction is inputted from the user through an input unit 138 (S303). Then, the generation and display processing of the virtual object 202 is performed so as to make the virtual object continue to be displayed in the correct orientation even when the position and orientation of the camera 133 is changed in accordance with the movements of the user (S305).

On the other hand, the user moves the physical object 108 so that it is seen as completely overlapping the virtual object 202, while observing the physical object 108 and the virtual object 202 in the HMD 132. Then, when the physical object 108 is made to be seen as completely overlapping the virtual object 202, the user depresses a matching instruction button and the like included in the input unit 138, and notifies the system control unit 101 that the both objects are brought into a matched condition.

In this case, the overlap in the position and orientation is preferably determined by observing the overlapping state between the physical object 108 and the virtual object 202 from vertically above the physical object 108. This is because the physical object and the virtual object are matched to each other except the horizontal position and the amount of rotation about the axis in the vertical direction, so that the horizontal position and the amount of rotation about the axis in the vertical direction which are not matched, can only be visually recognized by observing from vertically above the physical object 108.

When a matching instruction input from the user is detected in S303, the system control unit 101 records an offset value at that time, which value is used as a difference between the position and orientation measurement value of the physical object 108 and the position and orientation value of the virtual object 202 on the system (S307). Thereby, the amount of position and orientation correction necessary for the subsequent process can be determined, and the calibration process is completed.

In the subsequent process, when the virtual object is rendered so as to follow the movement of the physical object 108, the position and orientation value corrected by the above described offset value is used as the position and orientation value on the system. Thereby, even when the physical object 108 is moved or its orientation is changed, the virtual object 202 can always be observed to be in a state of completely overlapping the physical object 108 by the user.

As described above, according to the present embodiment, it is possible to detect an instruction indicating that a physical object having a fixed plane where it can be moved and a virtual object which is rendered so as to be positioned on the plane where the physical object can be moved, are observed to be in a predetermined positional relationship. Then, a difference between the position and orientation value of the virtual object and the position and orientation value of the physical object at the time when the instruction is detected, is acquired and used as the correction value for correcting the difference between the physical object and the virtual object. With such configuration, it is possible to perform the calibration processing easily and accurately.

Alternatively, according to the present invention, the difference between the position and orientation of the physical object having a fixed plane where it can be moved, and the position and orientation of the virtual object which is rendered so as to be positioned on the plane where the physical object can be moved, when the both objects satisfy a predetermined positional relationship, is acquired as the correction value. Then, the correction value is expressed by a combination of parallel movement on the predetermined plane of the physical object and rotation about the axis set in the direction perpendicular to the predetermined plane. With such configuration, it is possible to perform the calibration processing easily and accurately.

Further, in the case where CG is displayed, the CG using a solid model and a wire-frame model may be displayed, or a contour (shadow) when the CG is projected on a predetermined plane may also be displayed. In this case, the CG which is a virtual object can be easily superimposed on the physical object.

Further, the form of CG may be arranged to be changed by an instruction from the user.

Another Embodiment

Note that a case is also included in the scope of the present invention, wherein a software program for realizing the functions of the above described embodiment, is supplied to a system or an apparatus having a computer capable of executing the program, directly from a recording medium or by using the wired/wireless communication, and thereby the functions equivalent to those of the above described embodiment are attained by making the computer of the system or the apparatus execute the supplied program.

Therefore, the program codes themselves which are supplied and installed in a computer in order to realize the functional processing of the present invention by the computer, also realize the present invention. That is, the computer program itself for realizing the functional processing of the present invention is included in the scope of the present invention.

In this case, any form of program including object codes, a program executed by an interpreter, script data supplied to an OS and the like may be included, provided that they have the functions of the program.

The recording medium for supplying the program includes, for example, magnetic recording media such as flexible disk, hard disk and magnetic tape, optical/optical magnetic storage media such as MO, CD-ROM, CD-R, CD-RW, DVD-ROM, DVD-R, DVD-RW, a nonvolatile semiconductor memory and the like.

The method for supplying the program by using the wired/wireless communication, includes a method in which a data file (program data file) which can serve as the computer program forming the present invention on a client computer, such as the computer program itself which forms the present invention or a file which is compressed and includes an automatic installation function, is stored in a server on a computer network and downloaded to a client computer which is allowed to be connected to the server, and the like. In this case, it is also possible to divide the program data file into plural segment files, and to arrange the segment files in different servers.

That is, a server apparatus which enables the program data file for realizing the functional processing of the present invention to be downloaded to plural users, is also included in the scope of the present invention.

Further, the functions of the above described embodiments can also be realized by the arrangement such that the program of the present invention is encrypted to be stored in a recording medium such as a CD-ROM and distributed to users, that key information for decrypting the encrypted program is supplied to users who satisfy a predetermined qualification, by allowing the users to download the key information, for example, from a homepage via the internet, and that the encrypted program is executed by using the key information so as to be installed in a computer.

Further, in addition to realizing the above described functions of the embodiments by making the program read and executed by a computer, an OS and the like operating on the computer executes a part of or all of the actual processing on the basis of the instruction of the program, as a result of which the functions of the above described embodiments can also be realized by the processing.

Further, the program read from the recording medium is written in a memory provided on a function expansion board inserted into the computer or a function expansion unit connected to the computer, and thereafter, a CPU and the like provided on the function expansion board or the function expansion unit executes a part of or all of the actual processing on the basis of the instruction of the program, as a result of which the functions of the above described embodiments can also be realized by the processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-106792, filed on Apr. 1, 2005, which is hereby incorporated by reference herein its entirety.

What is claimed is:

1. A calibration method for acquiring a correction value to correct position and orientation measured by using a position and orientation sensor provided on a physical object, the calibration method comprising:

a first measuring step of measuring position and orientation of the physical object when a calibration is started;

a capturing step of capturing an image of the physical object by a camera;

a virtual object generation step of generating an image of a virtual object existing on a plane on which the physical object can be moved;

a displaying step of displaying a composite image formed by superimposing the image of the virtual object on a captured image of the physical object;

a detecting step of detecting an instruction indicating that an observer viewing the composite image regards the position and the orientation of the physical object as matching the position and the orientation of the virtual object;

a second measuring step of measuring position and orientation of the physical object when the instruction is detected;

an acquiring step of acquiring the correction value expressed by parallel movement of the physical object on the plane and rotation of the physical object about an axis set in the direction perpendicular to the plane on the basis of the position and orientation measured in the first measuring step and the position and orientation measured in the second measuring step.

2. A calibration method for acquiring a correction value to correct position and orientation measured detected by using a position and orientation sensor provided on a physical object, the calibration method comprising:

a first measuring step of measuring, when a calibration is started, position and orientation of the physical object which can be moved;

a capturing step of capturing an image of the physical object by a camera provided on a head mounted type display device worn by an observer;

a second measuring step of measuring position and orientation of the camera;

a virtual object generation step of rendering a virtual object on the basis of the position and orientation measured in the second measuring step, in a manner that the virtual object is to be observed by the observer as existing on a predetermined plane;

a displaying step of compositing the rendered virtual object and an image captured by the camera and of displaying the composite image on the head mounted type display device;

a detecting step of detecting an instruction by the observer, the instruction indicating that the physical object is observed by the observer with a condition that the observer viewing the composite image regards the position and the orientation of the physical object as matching the position and the orientation of the virtual object;

a third measuring step of measuring position and orientation of the physical object when the instruction is detected; and an acquiring step of acquiring the correction value expressed by parallel movement of the physical object on the predetermined plane and rotation of the physical object about an axis set in the direction perpendicular to the predetermined plane on the basis of the position and orientation measured in the first measuring step and the position and orientation measured in the third measuring step, wherein in the virtual object generation step, the virtual object is rendered in a moved and/or rotated manner on the plane on the basis of the position and orientation measured in the first measuring step.

3. The calibration method according to claim 2, wherein the predetermined plane is a horizontal plane and the direction perpendicular to the plane is a vertical direction.

4. The calibration method according to claim 2, wherein the virtual object generation step renders the virtual object corresponding to the position and orientation of the physical object.

5. The calibration method according to claim 2, wherein the virtual object generation step renders the virtual object by using position and orientation which are corrected by using the acquired correction value.

6. A calibration apparatus for acquiring a correction value to correct position and orientation measured by using a position and orientation sensor provided on a physical object, the calibration apparatus comprising:

a first measuring unit adapted to measure position and orientation of the physical object when a calibration is started;

a capturing unit to capture an image of the physical object by a camera;

a virtual object generation unit adapted to generate an image of the a virtual object existing on a plane on which the physical object can be moved;

a displaying unit adapted to display a composite image formed by superimposing the image of the virtual object on a captured image of the physical object;

a detecting unit adapted to detect an instruction indicating that an observer viewing the composite image regards the position and the orientation of the physical object as matching the position and the orientation of the virtual object;

a second measuring unit adapted to measure position and orientation of the physical object when the instruction is detected;

an acquiring unit adapted to acquire the correction value expressed by parallel movement of the physical object on the plane and rotation of the physical object about an axis set in the direction perpendicular to the plane on the basis of the position and orientation measured by the first measuring unit and the position and orientation measured by the second measuring unit.

7. A calibration apparatus for acquiring a correction value to correct position and orientation measured detected by using a position and orientation sensor provided on a physical object, the calibration apparatus comprising:

a first measuring unit adapted to measure, when a calibration is started, position and orientation of the physical object which can be moved;

a capturing unit adapted to capture an image of the physical object by a camera provided on a head mounted type display device worn by an observer;

a second measuring unit adapted to measure position and orientation of the camera;

a virtual object generation unit adapted to render a virtual object on the basis of the position and orientation measured in the second measuring unit, in a manner that the virtual object is to be observed by the observer as existing on a predetermined plane;

a displaying unit adapted to composite the rendered virtual object and an image captured by the camera and to display the composite image on the head mounted type display device;

a detecting unit adapted to detect an instruction by the observer, the instruction indicating that the physical object is observed by the observer with a condition that the observer viewing the composite image regards the position and the orientation of the physical object as matching the position and the orientation of the virtual object;

a third measuring unit adapted to measure position and orientation of the physical object when the instruction is detected; and an acquiring unit adapted to acquire the correction value expressed by parallel movement of the physical object on the predetermined plane and rotation of the physical object about an axis set in the direction perpendicular to the predetermined plane on the basis of the position and orientation measured by the first measuring unit and the position and orientation measured by the third measuring unit, wherein in the virtual object generation unit, the virtual object is rendered in a moved and/or rotated manner on the plane on the basis of the position and orientation measured in the first measuring unit.

8. The calibration apparatus according to claim 7, wherein the predetermined plane is a horizontal plane and the direction perpendicular to the plane is a vertical direction.

9. The calibration apparatus according to claim 7, wherein the virtual object generation unit renders the virtual object corresponding to the position and orientation of the physical object.

10. The calibration apparatus according to claim 7, wherein the virtual object generation unit renders the virtual object by using position and orientation which are corrected by using the acquired correction value.

* * * * *